United States Patent
Pinheiro et al.

(10) Patent No.: US 9,750,076 B2
(45) Date of Patent: Aug. 29, 2017

(54) MOBILE DEVICE POWER SAVINGS MODE

(71) Applicant: InterDigital Patent Holdings, Inc., Wilmington, DE (US)

(72) Inventors: Ana Lucia A. Pinheiro, Beaverton, OR (US); Jean-Louis Gauvreau, La Prairie (CA); Rocco Di Girolamo, Laval (CA); Joseph M. Murray, Schwenksville, PA (US); Christopher R. Cave, Dollard-des-Ormeaux (CA); Diana Pani, Montreal (CA); Behrouz Aghili, Commack, NY (US); Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/347,738

(22) Filed: Nov. 9, 2016

(65) Prior Publication Data

US 2017/0055312 A1 Feb. 23, 2017

Related U.S. Application Data

(63) Continuation of application No. 15/166,244, filed on May 26, 2016, now abandoned, which is a
(Continued)

(51) Int. Cl.
*H04W 68/00* (2009.01)
*H04W 76/04* (2009.01)
(Continued)

(52) U.S. Cl.
CPC ......... *H04W 76/046* (2013.01); *H04W 4/005* (2013.01); *H04W 8/22* (2013.01);
(Continued)

(58) Field of Classification Search
None
See application file for complete search history.

(56) References Cited

U.S. PATENT DOCUMENTS

| | | |
|---|---|---|
| 2005/0075148 A1 | 4/2005 | Park |
| 2005/0159107 A1 | 7/2005 | Mauney et al. |

(Continued)

FOREIGN PATENT DOCUMENTS

| | | |
|---|---|---|
| JP | 11-55176 A | 2/1999 |
| JP | 2005-080312 A | 3/2005 |
| JP | 2009-294814 A | 12/2009 |

OTHER PUBLICATIONS

3rd Generation Partnership Project (3GPP), TR 23.888 V1.0.0, "Technical Specification Group Services and System Aspects, System Improvements for Machine-Type Communications, (Release 10)", Jul. 2010, pp. 1-80.

(Continued)

*Primary Examiner* — Suhail Khan
(74) *Attorney, Agent, or Firm* — Condo Roccia Koptiw LLP

(57) ABSTRACT

A method and apparatus for supporting machine-type communications (MTC) are disclosed. A wireless transmit/receive unit (WTRU) may configure itself to operate in a mobile-originated-only mode. The WTRU may perform no, or a subset of, radio resource control (RRC) idle and/or non-access stratum (NAS) idle/standby state procedures in the mobile-originated-only mode. For example, the WTRU may perform cell reselection but not paging monitoring in the mobile-originated-only mode. Alternatively, the WTRU may perform paging monitoring but not cell reselection and location update. The operation in the mobile-originated-only mode may be triggered explicitly or implicitly. For example, the WTRU may operate in the mobile-originated-only mode if an inactivity timer expires. The WTRU may switch the (Continued)

mode in accordance with a pre-configured schedule. After transition of the operation mode, the WTRU may send a message to the network indicating such mode switch.

20 Claims, 6 Drawing Sheets

Related U.S. Application Data continuation of application No. 14/884,735, filed on Oct. 15, 2015, now Pat. No. 9,380,455, which is a continuation of application No. 14/559,470, filed on Dec. 3, 2014, now Pat. No. 9,191,983, which is a continuation of application No. 14/270,063, filed on May 5, 2014, now Pat. No. 9,008,643, which is a continuation of application No. 13/025,675, filed on Feb. 11, 2011, now Pat. No. 8,755,825.

(60) Provisional application No. 61/304,383, filed on Feb. 12, 2010.

(51) Int. Cl.
| | |
|---|---|
| *H04W 64/00* | (2009.01) |
| *H04W 4/00* | (2009.01) |
| *H04W 8/22* | (2009.01) |
| *H04W 88/02* | (2009.01) |
| *H04W 8/24* | (2009.01) |
| *H04W 52/02* | (2009.01) |

(52) U.S. Cl.
CPC ......... *H04W 8/24* (2013.01); *H04W 52/0209* (2013.01); *H04W 64/00* (2013.01); *H04W 76/04* (2013.01); *H04W 88/02* (2013.01); *Y02B 60/50* (2013.01)

(56) References Cited

U.S. PATENT DOCUMENTS

| | | | |
|---|---|---|---|
| 2008/0219210 | A1 | 9/2008 | Shuey et al. |
| 2008/0299958 | A1 | 12/2008 | Buckley et al. |
| 2009/0141625 | A1 | 6/2009 | Ghai et al. |
| 2010/0099402 | A1 | 4/2010 | Wu |
| 2010/0113010 | A1 | 5/2010 | Tenny et al. |
| 2010/0113024 | A1 | 5/2010 | Wu |
| 2011/0117946 | A1 | 5/2011 | Vainola et al. |

OTHER PUBLICATIONS

3rd Generation Partnership Project (3GPP), TS 22.368 V1.1.1, "Technical Specification Group Services and System Aspects, Service Requirements for Machine-Type Communications, Stage 1 (Release 10)", Nov. 2009, pp. 1-23.
3rd Generation Partnership Project (3GPP), TS 22.368 V10.3.0, "Technical Specification Group Services and System Aspects, Service Requirements for Machine-Type Communications (MTC), Stage 1 (Release 10)", Dec. 2010, pp. 1-18.
3rd Generation Partnership Project (3GPP), TS 22.368 V11.0.0, "Technical Specification Group Services and System Aspects, Service Requirements for Machine-Type Communications (MTC), Stage 1 (Release 11)", Dec. 2010, pp. 1-23.
3rd Generation Partnership Project (3GPP), TS 23.060 V10.2.0, "Technical Specification Group Services and System Aspects, General Packet Radio Service (GPRS), Service Description, Stage 2 (Release 10)", Dec. 2010, pp. 1-316.
3rd Generation Partnership Project (3GPP), TS 23.060 V3.17.0, "Technical Specification Group Services and System Aspects, General Packet Radio Service (GPRS), Service Description, Stage 2 (Release 1999)", Dec. 2006, pp. 1-193.
3rd Generation Partnership Project (3GPP), TS 23.060 V4.11.0, "Technical Specification Group Services and System Aspects, General Packet Radio Service (GPRS), Service Description, Stage 2 (Release 4)", Dec. 2006, pp. 1-199.
3rd Generation Partnership Project (3GPP), TS 23.060 V5.13.0, "Technical Specification Group Services and System Aspects, General Packet Radio Service (GPRS), Service Description, Stage 2 (Release 5)", Dec. 2006, pp. 1-201.
3rd Generation Partnership Project (3GPP), TS 23.060 V6.15.0, "Technical Specification Group Services and System Aspects, General Packet Radio Service (GPRS), Service Description, Stage 2 (Release 6)", Dec. 2006, pp. 1-209.
3rd Generation Partnership Project (3GPP), TS 23.060 V7.10.0, "Technical Specification Group Services and System Aspects, General Packet Radio Service (GPRS), Service Description, Stage 2 (Release 7)", Sep. 2010, pp. 1-217.
3rd Generation Partnership Project (3GPP), TS 23.060 V7.9.0, "Technical Specification Group Services and System Aspects, General Packet Radio Service (GPRS), Service Description, Stage 2 (Release 7)", Dec. 2009, pp. 1-216.
3rd Generation Partnership Project (3GPP), TS 23.060 V8.11.0, "Technical Specification Group Services and System Aspects, General Packet Radio Service (GPRS), Service Description, Stage 2 (Release 8)", Dec. 2010, pp. 1-282.
3rd Generation Partnership Project (3GPP), TS 23.060 V8.7.0, "Technical Specification Group Services and System Aspects; General Packet Radio Service (GPRS); Service description; Stage 2 (Release 8)", Dec. 2009, pp. 1-280.
3rd Generation Partnership Project (3GPP), TS 23.060 V9.3.0, "Technical Specification Group Services and System Aspects; General Packet Radio Service (GPRS), Service Description, Stage 2 (Release 9)", Dec. 2009, pp. 1-295.
3rd Generation Partnership Project (3GPP), TS 23.060 V9.7.0, "Technical Specification Group Services and System Aspects, General Packet Radio Service (GPRS), Service Description, Stage 2 (Release 9)", Dec. 2010, pp. 1-300.
3rd Generation Partnership Project (3GPP), TS 23.401 V10.2.0, "Technical Specification Group Services and System Aspects, General Packet Radio Service (GPRS) Enhancements for Evolved Universal Terrestrial Radio Access Network (E-UTRAN) Access (Release 10)", Dec. 2010, pp. 1-276.
3rd Generation Partnership Project (3GPP), TS 23.401 V10.2.1, "Technical Specification Group Services and System Aspects, General Packet Radio Service (GPRS) Enhancements for Evolved Universal Terrestrial Radio Access Network (E-UTRAN) Access (Release 10)", Jan. 2011, pp. 1-276.
3rd Generation Partnership Project (3GPP), TS 23.401 V8.12.0, "Technical Specification Group Services and System Aspects, General Packet Radio Service (GPRS) Enhancements for Evolved Universal Terrestrial Radio Access Network (E-UTRAN) Access (Release 8)", Dec. 2010, pp. 1-242.
3rd Generation Partnership Project (3GPP), TS 23.401 V8.8.0, "Technical Specification Group Services and System Aspects, General Packet Radio Service (GPRS) Enhancements for Evolved Universal Terrestrial Radio Access Network (E-UTRAN) Access (Release 8)", Dec. 2009, pp. 1-239.
3rd Generation Partnership Project (3GPP), TS 23.401 V9.3.0, "Technical Specification Group Services and System Aspects, General Packet Radio Service (GPRS) Enhancements for Evolved Universal Terrestrial Radio Access Network (E-UTRAN) Access (Release 9)", Dec. 2009, pp. 1-254.
3rd Generation Partnership Project (3GPP), TS 23.401 V9.7.0, "Technical Specification Group Services and System Aspects, General Packet Radio Service (GPRS) Enhancements for Evolved Universal Terrestrial Radio Access Network (E-UTRAN) Access (Release 9)", Dec. 2010, pp. 1-259.
3rd Generation Partnership Project(3GPP), R2-100181, "Consideration on MTC Features", CATT, 3GPP TSG RAN WG2 Meeting #68bis Valencia, Spain, Jan. 18-22, 2010, pp. 1-5.
3rd Generation Partnership Project(3GPP), R2-100287, "Discussion on Key Issues in RAN2 for Machine Type Communication (MTC)", Alcatel-Lucent Shanghai Bell, Alcatel-Lucent, 3GPP TSG-WG RAN2 #68-Bis, Valencia, Jan. 18-22, 2010, pp. 1-2.

(56) References Cited

OTHER PUBLICATIONS

3rd Generation Partnership Project(3GPP), R2-100537, "RAN Enhancements for Machine-Type Communication", Samsung, 3GPP TSG RAN WG2 #68 bis, Valencia, Spain, Jan. 18-22, 3 pages.
3rd Generation Partnership Project(3GPP), R3-100315, "MTC Features, RAN Enhancements and Related Procedures", CMCC, 3GPP TSG-RAN WG3 Meeting #66bis, Valencia, Spain, Jan. 18-22, 2010, pp. 1-3.
3rd Generation Partnership Project(3GPP), S1-091224, "Proposed Requirements to Reduce Location Updates for MTC Devices", Sierra Wireless, 3GPP TSG-SA1 #46, Chiba, Japan, May 11-15, 2009, 2 pages.
3rd Generation Partnership Project(3GPP), S2-091224, "Emergency Session Continuity-Location and UE Identity", Alcatel-Lucent, TCS, 3GPP TSG SA WG2 Meeting #71, Budapest, Hungary, Feb. 16-20, 2009, pp. 1-4.
3rd Generation Partnership Project(3GPP), TD S2-100814, "Key Issue-MTC Device Trigger", KPN, Sierra Wireless, 3GPP TSG SA WG2 Meeting #77, Shenzhen, China, Jan. 18-22, 2010, 2 pages.

MOBILE DEVICE POWER SAVINGS MODE

CROSS REFERENCE TO RELATED APPLICATIONS

This application is a continuation of U.S. patent application Ser. No. 15/166,244, filed May 26, 2016; which is a continuation of U.S. patent application Ser. No. 14/884,735, filed Oct. 15, 2015, now U.S. Pat. No. 9,380,455; which is a continuation of U.S. patent application Ser. No. 14/559,470, filed Dec. 3, 2014, now U.S. Pat. No. 9,191,983; which is a continuation of U.S. patent application Ser. No. 14/270,063, filed May 5, 2014, now U.S. Pat. No. 9,008,643; which is a continuation of U.S. patent application Ser. No. 13/025,675 filed Feb. 11, 2011, now U.S. Pat. No. 8,755,825, which claims the benefit of U.S. Provisional Application Ser. No. 61/304,383 filed Feb. 12, 2010, and this application claims the benefit of the filing date of all of these applications and hereby incorporates their contents by reference.

BACKGROUND

Machine-type communication (MTC) is a communication involving one or more entities that do not necessarily need human interaction. The MTC may involve a large number of communicating MTC devices, (i.e., wireless transmit/receive units (WTRUs) that are equipped for MTC), with no or little traffic destined to the MTC devices, (e.g., sensor networks). The MTC devices may be battery operated, and therefore saving battery consumption and allowing for longer operation without manual intervention would be necessary.

In MTC, in some use cases, a device may be required to support mobile originated communications only, (e.g., a metering system which periodically reports measurements). Where it is expected that a device may initiate or receive calls, the network should know the location of the device, (i.e., which cell or area the device is located), even when the device is in an idle mode, so that when a call needs to be made to that device, the call can be completed timely. However, if the device only makes calls, but never receives calls, the location of the device becomes less important, since the network does not need to find the device. In other use cases, a device may be required to support infrequent mobile terminated communications, (e.g., a metering system that supports device polling by the network).

SUMMARY

A method and an apparatus for supporting machine-type communications are disclosed. A WTRU may configure itself to operate in a mobile-originated-only mode based on a trigger. The WTRU may perform no, or a subset of, radio resource control (RRC) idle and/or non-access stratum (NAS) idle/standby state procedures in the mobile-originated-only mode. For example, the WTRU may perform cell reselection but not paging monitoring in the mobile-originated-only mode. Alternatively, the WTRU may perform paging monitoring but not cell reselection and location update. The operation in the mobile-originated-only mode may be triggered explicitly or implicitly. For example, the WTRU may initiate operation in the mobile-originated-only mode if an inactivity timer expires. The WTRU may switch the mode in accordance with a pre-configured schedule. After transition of the operation mode, the WTRU may or may not send a message to the network indicating such mode switch.

The operations in the mobile-originated-only mode may be supported by adding some modifications to RRC and/or NAS procedures. In order to accomplish the modifications, implementation may be made by using a separate RRC idle state, an RRC idle mode with a profile configuration configured for the mobile-originated-only mode, or a mobile originate only state in an RRC idle mode. Similarly, the NAS modifications may be made by either supporting a new NAS state or by using a new profile configuration in the mobile-originated-only mode.

Embodiments to support a new mode of operation referred to as "mobile-originated-only mode" are disclosed. This new mode of operation may be implemented using a new "mobile-originated-only state" or a new profile configuration for the RRC and/or NAS layers. The WTRU may send a message to a network indicating that the WTRU supports the mobile-originated-only mode and/or functionalities supported by the WTRU in the mobile-originated-only mode.

BRIEF DESCRIPTION OF THE DRAWINGS

A more detailed understanding may be had from the following description, given by way of example in conjunction with the accompanying drawings wherein.

DETAILED DESCRIPTION

Figure 1A:
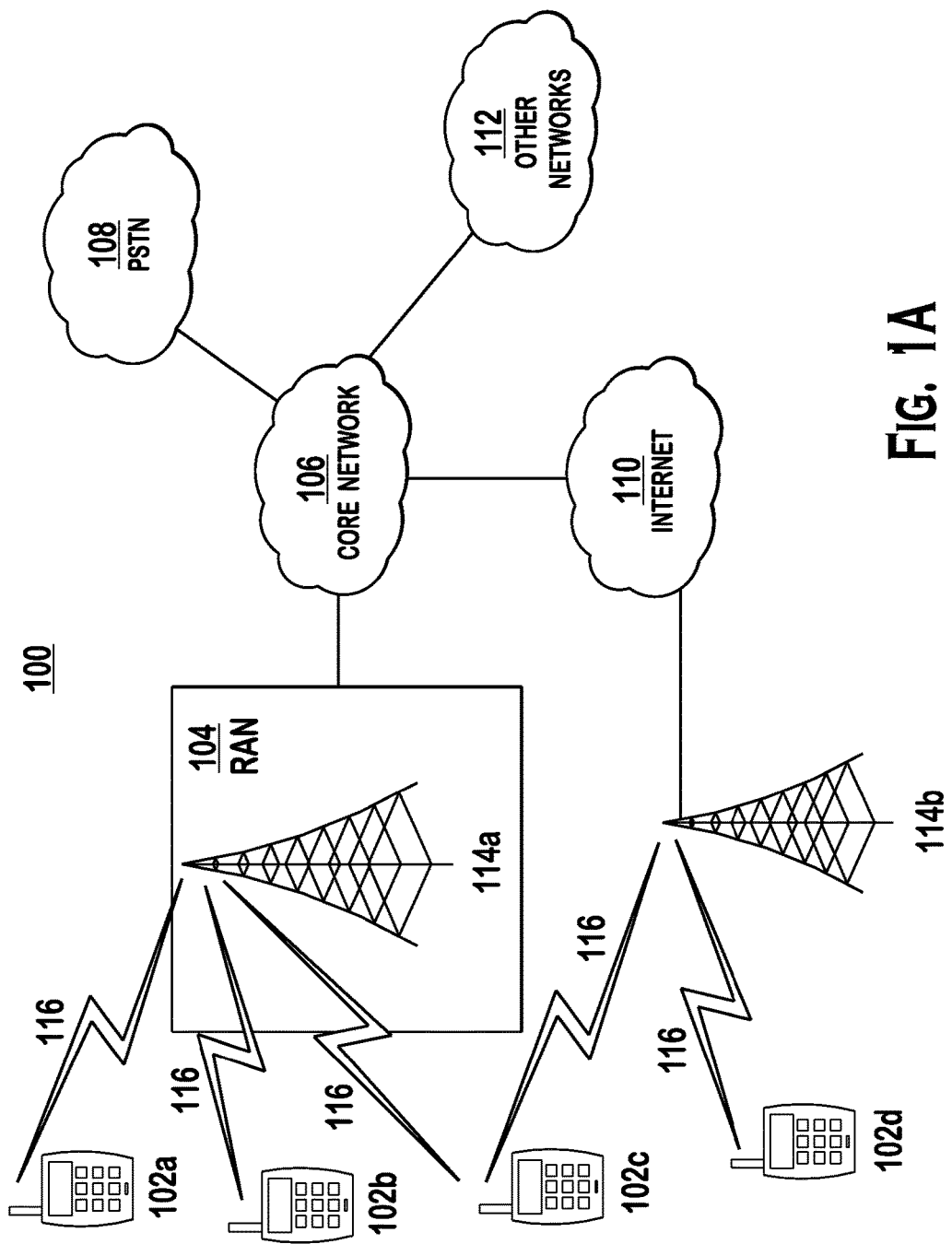
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN)

108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE radio access network (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
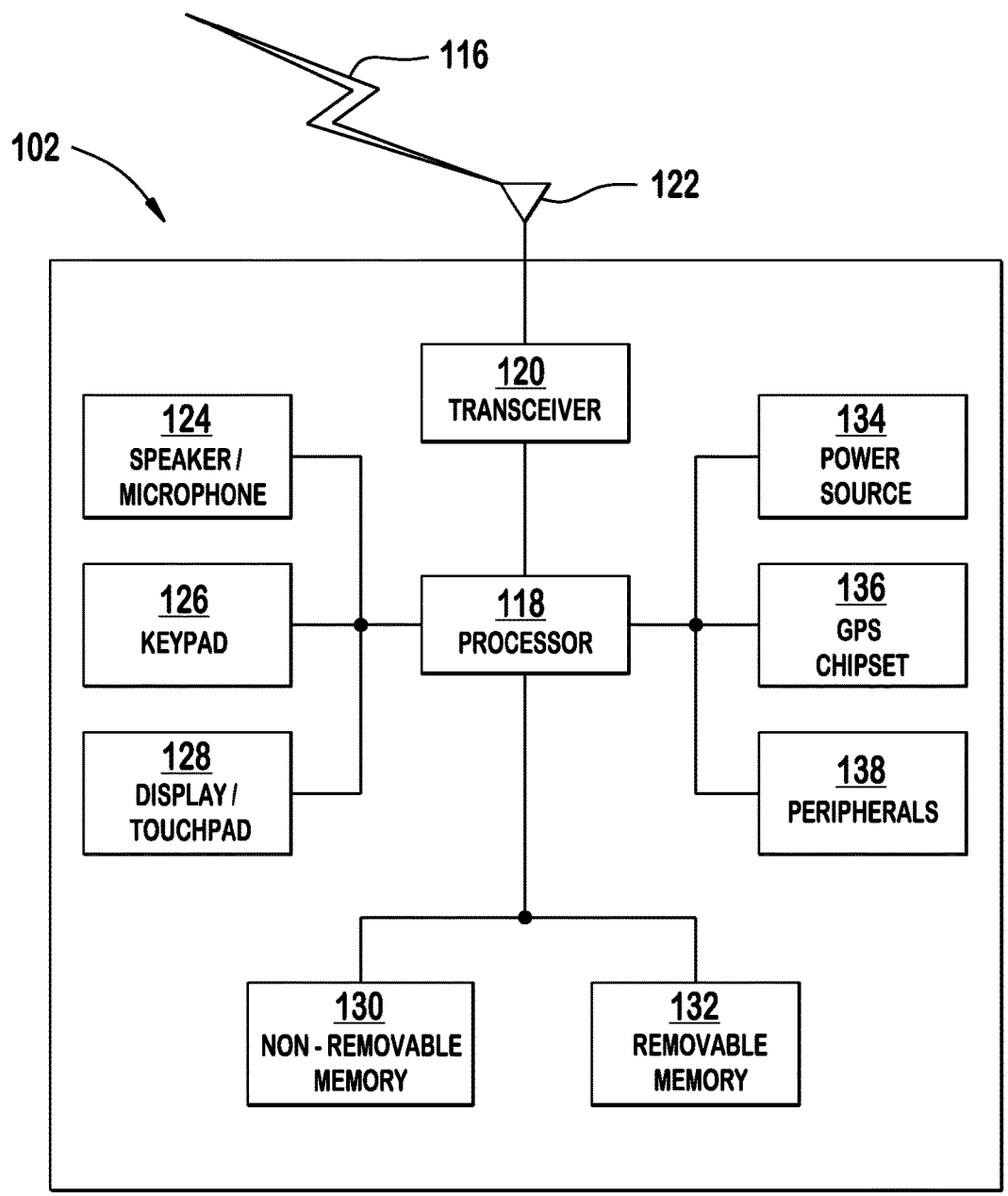
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chip set 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
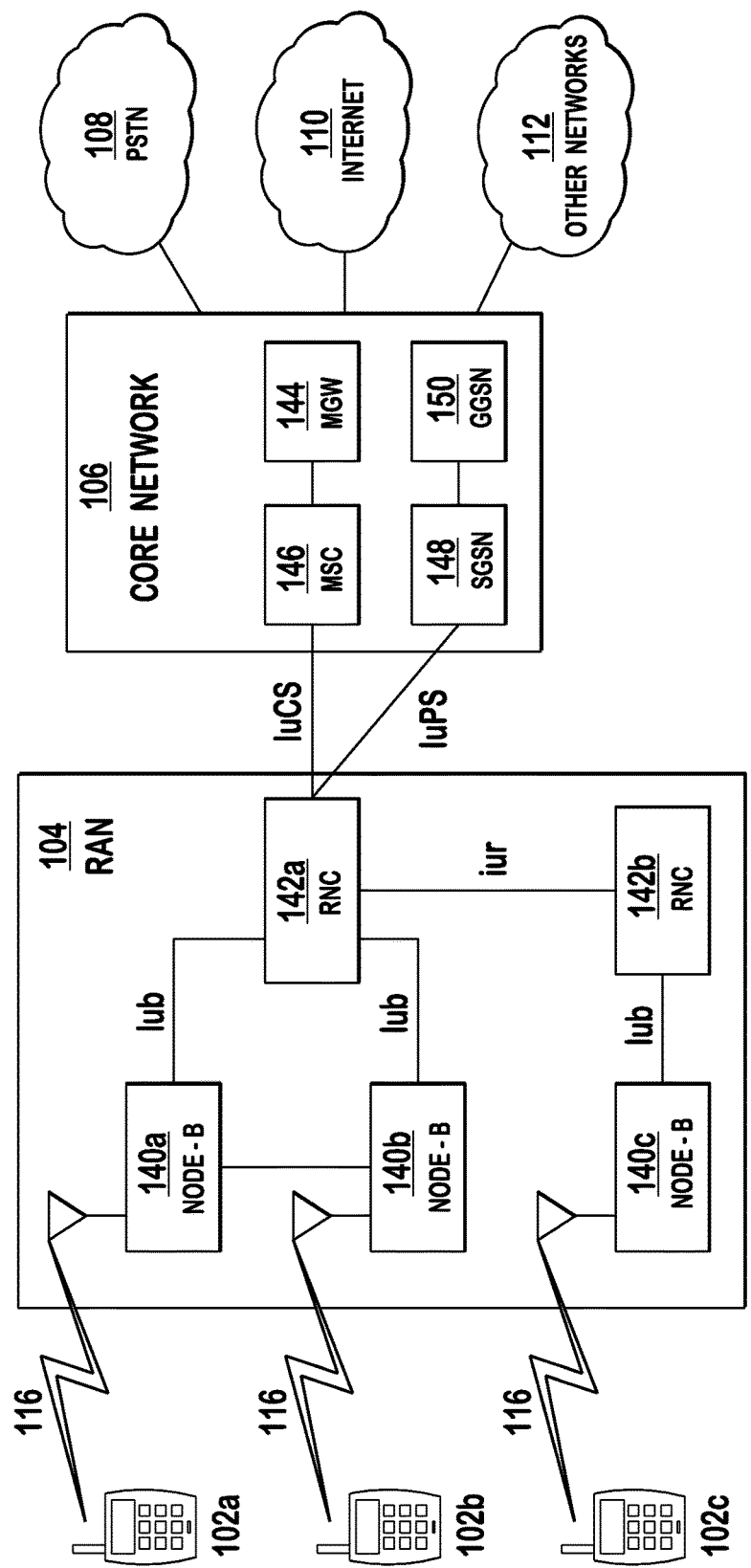
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
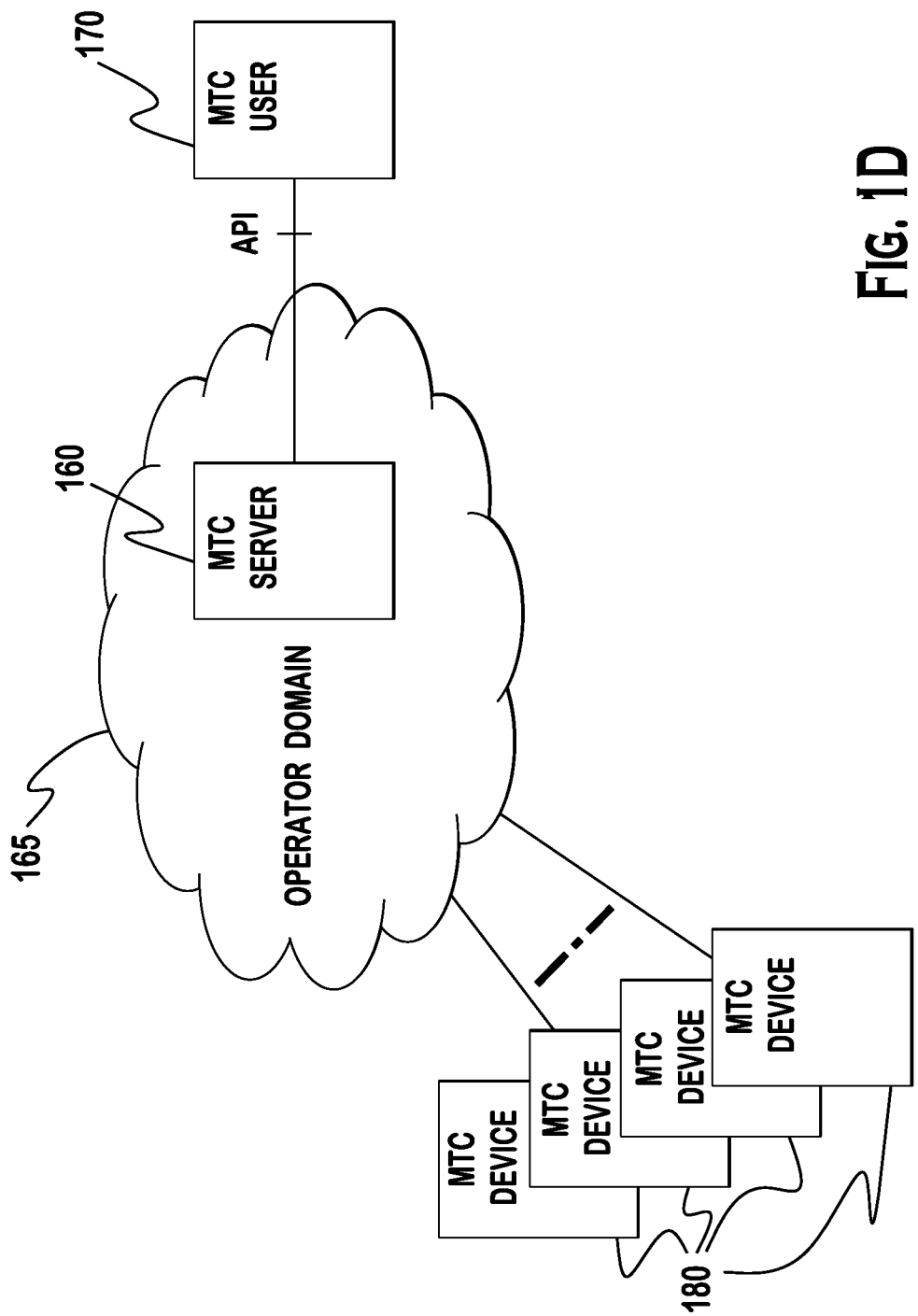
FIG. 1D is an example communication case where MTC devices communicate with an MTC server.

FIG. 1D shows an example communication case where MTC devices 180 communicate with an MTC server 160. An MTC device 180 is a WTRU equipped for machine type communication, which may communicate through a public land mobile network (PLMN) with an MTC server(s) 160 and/or other MTC device(s) 180. An MTC server 160 is a server, which communicates to the PLMN itself, and to MTC devices 180 through the PLMN. The MTC server 160 may have an interface which may be accessed by the MTC user 170. The MTC user 170 uses the service provided by the MTC server 160. In this example, the MTC server 160 is located in the operator domain 165, but may be located outside the operator domain 165. The MTC devices 160 may communicate with one or more MTC servers 160, and may also communicate each other. The network operator provides network connectivity to the MTC server(s).

It should be noted that the embodiments disclosed herein may be implemented in any type of wireless communication systems including, but not limited to, UMTS, long term evolution (LTE), cdma2000, IEEE 802.16, GERAN, and the like. It should be noted that the embodiments disclosed herein are applicable to both mobile-originated-only feature and the infrequent mobile terminated feature, and the terminology "mobile-originated-only mode" covers "infrequent-mobile-terminated mode" as well.

Figure 2:
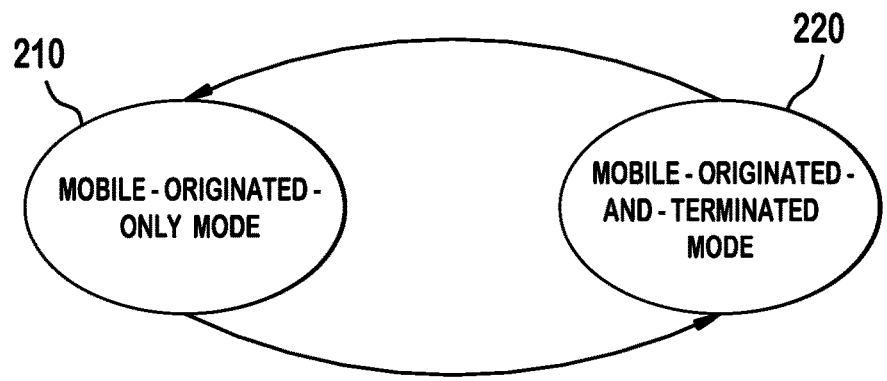
FIG. 2 shows a transition between the mobile-originated-only mode and the mobile-originated-and-terminated mode.

In accordance with one embodiment, a WTRU may switch back and forth between a mobile-originated-only mode 210 and a mobile-originated-and-terminated mode 220 based on a predetermined trigger(s). FIG. 2 shows a transition between the mobile-originated-only mode 210 and the mobile-originated-and-terminated mode 220. Alternatively, the WTRU may configure itself, or may be pre-configured, to operate in the mobile-originated-only mode 210. The operation in the mobile-originated-only mode may be triggered by an explicit or implicit trigger, (e.g., a command from the network, a preconfigured schedule, or the like). The WTRU may be configured to operate only in the mobile-originated-only mode. In this case, a trigger may not be necessary to initiate or resume the operation in the mobile-originated-only mode.

In the mobile-originated-and-terminated mode 220, the WTRU may listen to a paging channel or a paging indicator channel, or the like, (hereafter collectively "paging channel"), and/or perform mobility management procedures. In the mobile-originated-and-terminated mode 220, the network may reach the WTRU, for example, to perform tests, software updates, to establish a call, etc.

In the mobile-originated-only mode 210, the WTRU may perform no, or a subset of, idle mode procedures that may be performed in the mobile-originated-and-terminated mode. The WTRU may not perform certain mobility management procedures as it does not need to update its location to the network, or may not listen to a paging channel, since it is assumed that the WTRU will not receive calls. The functionalities that may be performed in the mobile-originated-only mode are explained in detail below.

The WTRU may be initially in a mobile-originated-only mode 210, and may transition to the mobile-originated-and-terminated mode 220, for example, once the WTRU initiates communication with the network. The network may take the WTRU out of the mobile-originated-only mode 210. The WTRU may exit the mobile originated-only mode 210 based on a timer or events, or the like.

In the mobile-originated-only mode 210, the WTRU may remain attached to the network, (e.g., registered with, and authenticated to, the network). Since the WTRU remains attached, a transition to a connected state would be much faster than the case the WTRU is detached.

The WTRU may not be reachable by the network while in the mobile-originated-only mode 210. Alternatively, the WTRU in the mobile-originated-only mode 210 may support a mechanism(s) to be reached by the network on some occasions.

The power savings in the mobile-originated-only mode would be very large as the device does not need to perform predetermined or configured background activities, such as paging monitoring, intra-cell, inter-cell, or inter-radio access technology (RAT) measurements in contrast to the normal idle mode.

Functionalities supported in the mobile-originated-only mode are explained hereafter.

In the mobile-originated-only mode, a WTRU may not perform paging monitoring. Consequently, the WTRU may not be able to receive mobile terminated calls and notification of the system information change via the paging channel.

In the mobile-originated-only mode, the WTRU may not perform cell reselection. The WTRU may not perform neighbor cell measurements for the cell reselection. Alternatively, the WTRU may perform neighbor cell measurements to determine whether a new cell needs to be selected, but may not perform other procedures, such as location area update, routing area update, or tracking area update, (hereafter collectively "location area update"). If the WTRU reselects a new cell according to the neighbor cell measurements, the WTRU may acquire and store the system information of the new cell, or alternatively may wait for a trigger, (e.g., moving out of the mobile-originated-only mode, a trigger for an RRC connection, or the like), before acquiring the system information.

In the mobile-originated-only mode, the WTRU may not perform a location area update even if a cell in a new location area, routing area, or tracking area, (hereafter collectively "location area"), is selected, or a new public land mobile network (PLMN) is entered. Alternatively, entering a new PLMN may be a trigger to perform a location area update.

Alternatively, while in the mobile-originated-only mode, the WTRU may perform a subset of the functionalities that are performed in an idle mode. For example, a WTRU in the mobile-originated-only mode may not perform background check for higher priority PLMN search, cell reselection, or paging monitoring, etc.

The WTRU may operate in the mobile-originated-only mode on a per PLMN basis. For example, the WTRU may have a list of allowed PLMNs that indicate the mode of operation for each PLMN, (i.e., a mobile-originated-only mode or a mobile-originated-and-terminated mode for each allowed PLMN). The list may be maintained in the WTRU, for example, in the universal subscriber identity module (USIM).

WTRUs, (i.e., MTC devices), may be mobile, may have limited mobility, or may be stationary. In case WTRUs may move anywhere, no cell reselection implies no paging monitoring and no location area updates. No location area updates imply no paging because the network does not know where the WTRU is located. In contrast, stationary WTRUs may not perform mobility procedures such as cell reselection, location area updates, or the like. In this case, even though the WTRUs do not perform location area updates, the network can still find the WTRUs since there is no change in location, therefore the WTRUs can still monitor the paging channel. In this case the WTRUs may have a longer discontinuous reception (DRX) cycle length in order to allow for battery savings. If the WTRU has a limited mobility, (e.g., the WTRU remains in the same location area or is restricted to a group of cells), the WTRU may not perform location updates, but the WTRU can be paged since the location is known.

The mobile-originated-only mode may support one or a combination of the above functionalities for the mobile, limited mobility, or stationary WTRUs. Table 1 shows example options of supported functionalities for the mobile, stationary, and limited mobility WTRUs in the mobile-originated-only mode. It should be noted that the functionalities listed in Table 1 are not exhaustive and other functionalities may be added.

TABLE 1

| Function-alities | Option 1 (Mobility) | Option 2 (Mobility) | Option 3 (Mobility) | Option 4 (No Mobility) | Option 5 (Limited Mobility) |
| --- | --- | --- | --- | --- | --- |
| Paging monitoring | No | No | No | Yes | Yes |
| Cell reselection | Yes | Yes | No | No | Yes |
| Location update | Yes | No | No | No | No |

In option 1, a WTRU may not perform paging monitoring but may perform cell reselection and location update. The WTRU may read a broadcast channel once the WTRU selects or reselects a cell or when the WTRU moves out of the mobile-originated-only mode, but may not be notified of changes in the broadcast channel information since the WTRU does not monitor the paging channel. When the WTRU needs to transmit, the WTRU may exit the mobile-originated-only mode, and check if there are any changes in the system information. For value tag system information blocks (SIBs), the WTRU may verify if there are changes in the value tags. For periodic SIBs, the WTRU may read the SIBs if the validity has expired. If there are any changes, the WTRU obtains the system information, and then starts a transmission.

The WTRU may inform the network that the WTRU exited the mobile-originated-only mode. The network may then update the state information that it may have stored for the WTRU, and may not wait for the WTRU to establish a connection with the network before sending a downlink transmission (signaling or data) to the WTRU. The indication may be sent to the network in the radio resource control (RRC) or non-access stratum (NAS) messages. If the indication is sent over RRC messages, (e.g., RRCConnectionSetupComplete), the RAN node, (e.g., RNC, eNode B), may forward this indication to the mobility management entity (MME)/serving GPRS support node (SGSN) over the S1/radio access network application part (RANAP) messages. Alternatively, the WTRU may send an NAS message, such as a tracking area update (TAU) message with this indication while setting the 'active flag' bit in the TAU message to '1' that indicates to the network to establish the user plane bearers after the TAU procedure is completed. This may be done instead of sending a service request message which is 4-octets long and does not have a space to include such indication. Alternatively, an extended service request or a modified service request message may be sent with an additional information element (IE) to provide this indication to the core network, (e.g., MME or SGSN).

In option 2, a WTRU may not perform paging monitoring and location area update but may perform neighbor cell measurements and cell re-selection. Because the WTRU is performing cell reselection the WTRU may read the broadcast channel every time a cell is re-selected. However, the WTRU may not be notified of the broadcast information changes, because the WTRU does not monitor the paging channel. Alternatively, the WTRU may perform cell reselection, but may not acquire and store the system information. The WTRU may wait to transition out of the mobile-originated-only mode, or until an uplink transmission is initiated before acquiring and storing the system information.

When the WTRU needs to transmit, the WTRU may exit the mobile-originated-only mode, and check if there are any changes in the system information. For value tag SIBs, the WTRU may verify if there are changes in the value tags. For periodic SIBs, the WTRU may read the SIBs if the validity has expired. If the WTRU did not acquire some of the SIBs it may read and acquire the remaining SIBs. If there are changes in the location area (i.e., location area, routing area, or tracking area), the WTRU may perform a location update procedure. If the network detects a location area update, the network is aware that the WTRU has data to transmit and may allocate resources for the WTRU to transmit the data. Alternatively, the WTRU may explicitly indicate with the location area update that it wants to performs uplink transmissions.

In option 3, a WTRU may not perform paging monitoring, cell reselection, or location update. When the WTRU needs to transmit, the WTRU may exit the mobile-originated-only mode, and verify if the current cell is still a suitable cell. If it is, the WTRU may remain in the same cell. If it is not, the WTRU may perform a cell reselection procedure by performing measurements on the neighbor cells. If the neighbor cells are not suitable, the WTRU may perform initial cell selection. The WTRU may read the broadcast channel in the selected cell. If the selected cell is the same as the previous cell, the WTRU may only check if there are any changes in the system information. For value tag SIBs, the WTRU may verify if there are changes in the value tags. For periodic SIBs, the WTRU may read the SIBs if the validity has expired. If there are changes in the location, (location area, routing area, or tracking area), the WTRU may perform location update procedure. The WTRU may then start transmission.

In option 4, a WTRU may perform paging monitoring but may not perform cell reselection and location update. Option 4 is for the stationary WTRU. Since the WTRU is stationary, there is no need to perform cell reselection or location update. When the WTRU needs to transmit, the WTRU may exit the mobile-originated-only mode, and may start transmission.

In option 5, a WTRU may perform paging monitoring and cell reselection but may not perform location update. Option 5 is for a WTRU with limited mobility, (e.g., the WTRU remains in the same location area or it is restricted to a group of cells, which could be a single cell). Since the WTRU remains in the same location area, there is no need to perform location updates, and the WTRU can be paged without location updates since the location is known. When the WTRU needs to transmit, the WTRU may exit the mobile-originated-only mode, and may start transmission.

The WTRU may signal to the network that it supports the mobile-originated-only mode. This notification may imply a set of functionalities that are supported by the WTRU in the mobile-originated-only mode. Alternatively, the WTRU may specifically notify the network the functionalities supported by the WTRU in the mobile-originated-only mode, (e.g., paging monitoring, cell reselection, and/or location update).

In order to control the behaviors of the WTRU in the mobile-originated-only mode, a new mobile-originated-only state or a new profile configuration (hereafter referred to as "mobile-originated-only state or configuration") may be defined. The new mobile-originated-only state or configuration may be defined in the radio resource control (RRC) and/or non-access stratum (NAS) layers. It should be noted that the mobile-originated-only state or configuration may be implemented without an additional RRC and/or NAS state or configuration, and the embodiments disclosed herein may be implemented with or without the new RRC and/or NAS states or configuration.

Figure 3:
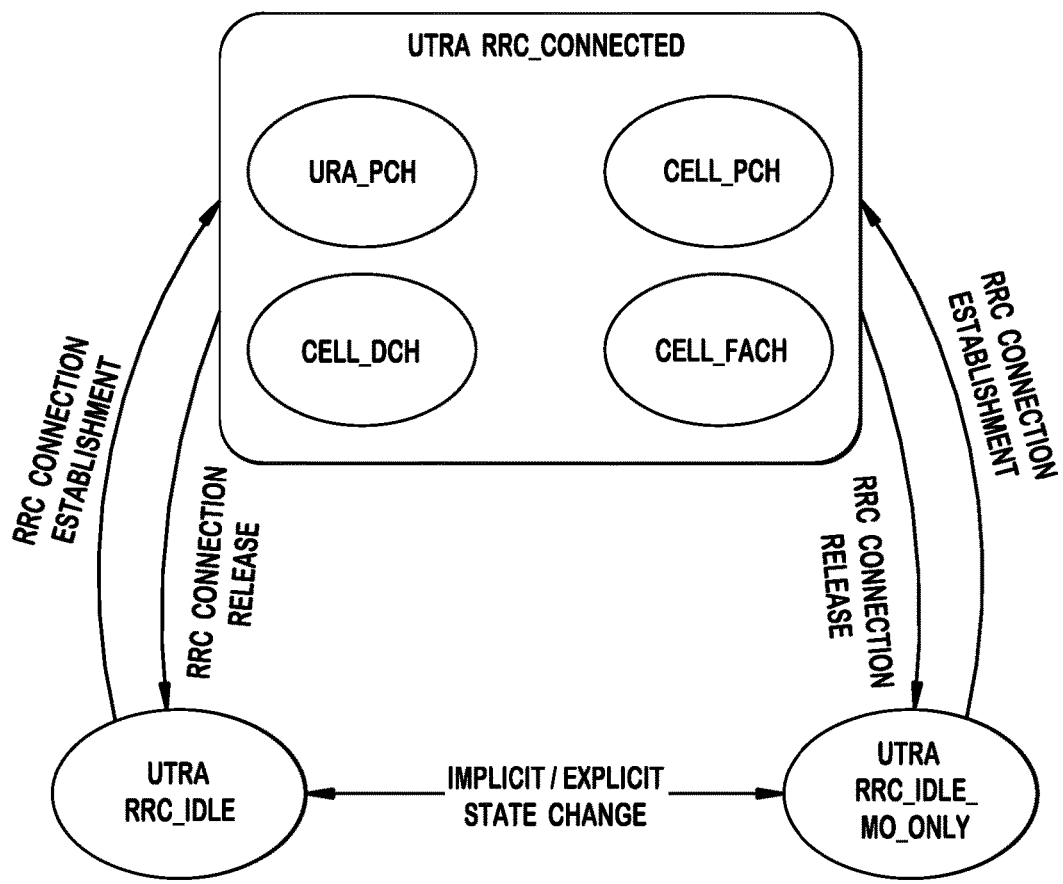
FIG. 3 is an example universal terrestrial radio access (UTRA) RRC state diagram in accordance with one embodiment.
Figure 4:
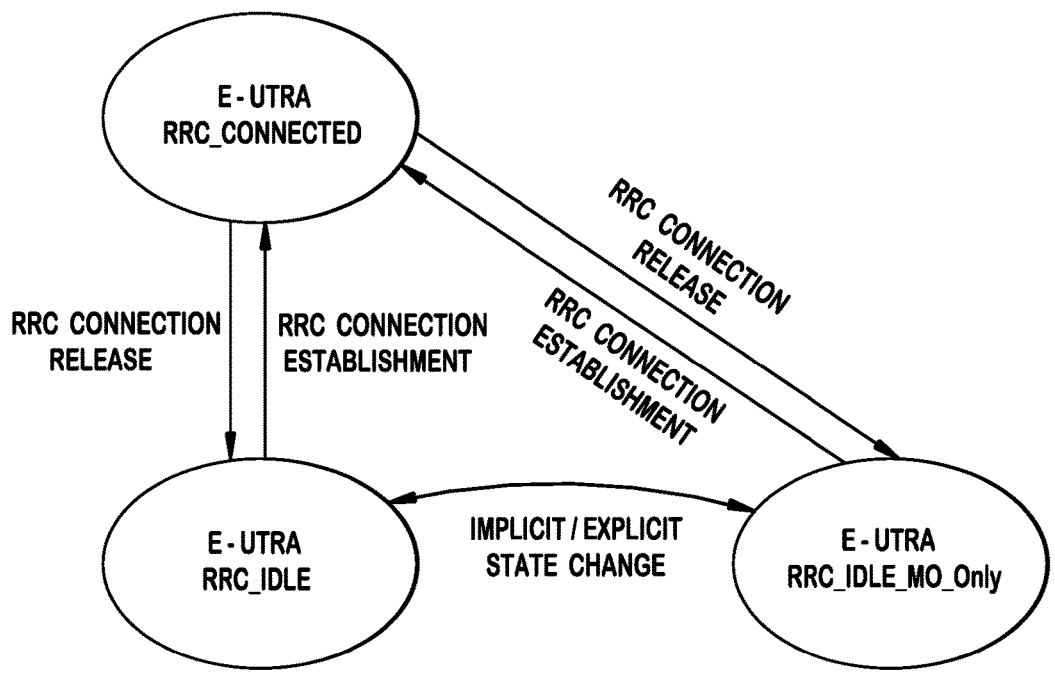
FIG. 4 is an example evolved universal terrestrial radio access (E-UTRA) RRC state diagram in accordance with one embodiment.

In accordance with one embodiment, the functionalities for the mobile originated-only-mode may be supported by a new RRC state. FIG. 3 is an example universal terrestrial radio access (UTRA) RRC state diagram in accordance with one embodiment. FIG. 4 is an example evolved universal terrestrial radio access (E-UTRA) RRC state diagram in accordance with another embodiment. In FIGS. 3 and 4, in addition to the conventional UTRA/E-UTRA RRC_CONNECTED and UTRA/E-UTRA RRC_IDLE states, the UTRA/E-UTRA RRC_IDLE_MO_ONLY state is defined to control the behavior of the WTRU and the network in the mobile-originated-only mode. The RRC state transitions between RRC_CONNECTED and RRC_IDLE or RRC_ILDE_MO_ONLY are triggered by the RRC connection establishment or release. The RRC state transitions between RRC_IDLE and RRC_IDLE_MO_ONLY may be triggered by the explicit or implicit triggers, which will be explained in detail below.

In accordance with another embodiment, the functionalities in the mobile-originated-only mode may be supported by an RRC_IDLE state with a new RRC profile configuration that captures all the specific operations in the mobile-originated-only mode. While operating in the mobile-originated-only mode, the WTRU may use the new RRC configuration in the IDLE mode. The WTRU may store in its memory the new profile configuration, and this would allow the WTRU to rapidly switch from one mode to another without acquiring the new RRC configuration from the network. The mobile-originated-only profile configuration may be sent to the WTRU using a dedicated RRC signaling message encapsulated in the conventional RRC messages, such as a RRC connection release message, or any other messages. Alternatively, the network may send the mobile-originated-only profile configuration over the SIBs. The WTRU operating for the first time in the mobile-originated-only mode may acquire the corresponding SIBs. When the WTRU switches out of this mode, the WTRU may store in a memory the mobile-originated-only configuration profile, allowing the WTRU to switch back in this mode without an interruption and without a need to reacquire the RRC configurations associated with this profile.

In accordance with another embodiment, a new state of the RRC idle mode may be defined. In this case, the RRC entity in the network side may or may not be aware of the fact that the WTRU is in this state since, from the network point of view, the WTRU may simply be in an RRC idle mode. The NAS state on the network side may be different for the WTRU (e.g., even if no new RRC state is used).

For the NAS support, the functionalities may be supported in a new NAS state. The WTRU may enter the new NAS state due to a trigger from the network in an NAS message. The NAS message may be an accept message which is sent from the network to the WTRU, (e.g., Attach Accept, Location Update Accept, and Tracking Area Update Accept, etc.). Alternatively, the transition to the new NAS state may be triggered by the WTRU, (e.g., via an internal inactivity timer). In this case, the WTRU may notify the network that the WTRU enters the new NAS state. Specific periods of time, (e.g., specific time of a day), may be reserved for the WTRU to operate in this new NAS state. The transition out of this new NAS state may be coordinated with the network based, for example, on the time of the day. The WTRU may send a notification to the network when the WTRU exits the new NAS state and becomes reachable. The triggers applicable to the RRC state transitions may be applied for the NAS state transitions, since the WTRU RRC and NAS may be synchronized, (i.e., using the same mode of operation (same state or configuration) at any given time).

An equivalent new mobile-originated-only NAS state may be configured on the network side, (e.g., in the MME, SGSN, or the like). The events applied for the WTRU may be applied to transition in and out of the NAS state at the network, (e.g., MME or SGSN). Based on network policy and events, the new NAS state at the network may change for a specific WTRU. This may trigger the network, (e.g., MME or SGSN), to request the WTRU to exit or enter other states. Such indication may be provided over NAS messages or over RRC or OMAMD/OTA messages. An RAN-based indication may also be forwarded over S1AP or RANAP or other equivalent messages.

Alternatively, the functionalities may be supported by an NAS idle/standby state with a new NAS profile/configuration. A new configuration may be provided to be supported in NAS evolved packet system (EPS) connection management (ECM) idle state (LTE), NAS packet mobility management (PMM) idle state au mode), or NAS standby state (A/Gb mode). The modifications on this state may depend on the functionality supported, as described above.

Because the SGSN/MME may perform an implicit general packet radio service (GPRS) detach any time after the WTRU reachable timer expires, the network may increase the value of this timer or disable it during this configuration mode of operation. The timer may be either the mobile reachable timer and/or the implicit detach timer.

Triggers for transitioning between the mobile-originated-only mode and the mobile-originated-and-terminated mode, (i.e., transitions between the RRC/NAS states or configuration), or for initiating and stopping operation in the mobile-originated-only mode are explained hereafter. The triggers may be explicit or implicit. The triggers disclosed below may be used in any embodiments disclosed above.

Transitions between the mobile-originated-only mode and the mobile-originated-and-terminated mode, (i.e., transitions between the RRC/NAS states or configuration), may be signaled explicitly via an RRC message, (e.g., RRC connection release message). A new parameter, information element (IE), or field may be included in the RRC message to trigger the transition from the RRC connected state to the mobile-originated-only state or configuration. Alternatively, the absence of a specific field in the RRC message may signify to the WTRU that the WTRU should operate in the mobile-originated-and-terminated mode, (i.e., a conventional RRC/NAS states).

The network may signal the WTRU to transition between the mobile-originated-only mode and the mobile-originated-and-terminated mode, (i.e., transitions between the RRC/NAS states or configuration), by sending idle mode signaling, such as a paging message, a broadcast message, or a cell broadcast service (CBS) message, or the like. Transition from the mobile-originated-only mode and the mobile-originated-and-terminated mode, (i.e., from the normal idle state to the mobile-originated-only state or configuration, (i.e., transitions between the RRC/NAS states or configuration)), may be triggered by a paging message, any NAS message, or the like.

The decision to trigger the transition of the state/configuration of operation may be based on network/operator policies, (e.g., the load conditions of the network). The radio access network, (e.g., evolved NodeB (eNB) or NodeB), may indicate this to the WTRU based on indications that are received over the S1AP or radio access network application part (RANAP) messages in case of LTE or 3G system, respectively. For example, the mobility management entity (MME) may send a request to the eNB to change the mode of operation of the WTRU to mobile-originated-only mode and this may be done by introducing a new IE on the S1AP message, (e.g., UEContextModificaitonRequest, or the like). This also applies to equivalent messages on 3G system or GPRS EDGE radio access network (GERAN) equivalent messages between the radio access network (RAN) and the core network.

Alternatively, upon registration, (e.g., attach procedure), or location area update procedures, (e.g., location area update, routing area update, or tracking area update, or combination of these), a WTRU may indicate to the network its previous mode or setting of the operation, (e.g., respective RRC and NAS states or profile configurations). The network, (e.g., MME), may also indicate the mode of operation to be used by the WTRU in the response message or any other NAS message, (e.g., EMM information or equivalent message). The WTRU may use the mode indicated by the network with settings to operate in certain mode.

Alternatively, the WTRU may follow the network's suggested mode of operation, (e.g., mobile-originated-only mode). When the NAS entity in the WTRU decides on the mode of operation, for example based on the indication from the MME, the NAS entity may inform the access stratum (AS)/RRC about the selected mode of operation.

Alternatively, the NAS or RRC entity in the WTRU may receive an indication about the configuration or mode of operation to use. The indication may be received from a user via an interface, (e.g., an interface on a vending machine), or the change of the settings due to user medication. Alternatively, the indication may be received via a short message service (SMS) message and/or the open mobile alliance (OMA) device management (DM) or over-the-air (OTA) protocol.

The configuration or mode of operation may be changed due to a change of device operation mode. For example, if the WTRU is operating in a mobile-originated-only mode, a change of the device operation mode from automatic to manual, (e.g., request for manual closed subscriber group (CSG) selection or manual PLMN selection), may trigger the WTRU to exit the mobile-originated-only mode, and a change from manual to automatic mode may trigger the WTRU to operate in a mobile-originated-only mode.

The transitioning between the mobile-originated-and-terminated mode and the mobile-originated-only mode may be triggered implicitly when a certain condition(s) is met. For example, the condition may be based on an inactivity timer, (e.g., if no downlink data is received within a preconfigured time). Once the inactivity timer expires or reaches a certain value, the WTRU may transition from the mobile-originated-only mode and the mobile-originated-and-terminated mode, (i.e., transitions between the RRC/NAS states or configuration (i.e., from the normal idle state to the mobile-originated-only state or configuration)), or vice versa.

The inactivity timer may be re-started or re-initialized based on an activity, such as a transition to the normal RRC idle state from the RRC connected state. Alternatively, the network may send a page message or idle mode signaling, (e.g., a CBS message), to re-start or re-initialize the inactivity timer and maintain the WTRU in the mobile-originated-and-terminated mode. Alternatively, the inactivity timer may be re-started or re-initialized while the WTRU is in an RRC connected state.

When the inactivity timer expires, the WTRU may autonomously transition to the mobile-originated-only state/configuration, (with respective RRC and NAS states or profile configurations), without notifying the network of the transition. Alternatively, the WTRU may autonomously transition to the mobile-originated-only state or configuration and send a notification to the network about the transition. Alternatively, the WTRU may signal this trigger to the network and wait for an explicit trigger from the network to transition to the mobile-originated-only state or configuration.

Alternatively, the WTRU may transition from the mobile-originated-only mode to the mobile-originated-and-terminated mode, in a periodic fashion, (e.g., once a day). Once the WTRU leaves the mobile-originated-only mode, the WTRU may perform all, or a subset of, normal idle mode procedures, (e.g., listen to the paging channel, perform cell reselection or location update, etc.). The WTRU may send a "polling" message to the network to indicate that the WTRU exits the mobile-originated-only mode and is now reachable. More specifically, when a periodic timer expires or when a certain time as configured by the network or application is reached, the WTRU may transition to a normal idle mode, and may initiate a transmission to notify the network that the WTRU is operating in a mobile-originated-and-terminated mode. The message transmitted may be an RRC message, wherein a new establishment cause or a new IE may be included to indicate this trigger. Alternatively, the message may be an NAS message. The NAS message may contain the location area, a new cause, and/or an additional information element(s) indicating that the WTRU has exited the mobile-originated-only mode. The network may then know that the WTRU is reachable and page the WTRU if it needs to reach the WTRU.

Alternatively, the network may broadcast a new flag in a particular SIB and the WTRU may receive the broadcast channel to monitor the SIB according to a configured periodicity. The monitoring time may correspond to a periodic timer or to an absolute time and length configured by the network. During that time the WTRU may remain in the mobile-originated-only mode and just monitor the SIB, rather than transitioning to the RRC idle mode. If the flag in the SIB is set, the WTRU may move out of the mobile-originated-only mode, may read all SIBs and start monitoring the paging channel, etc. Alternatively, if the flag is set the WTRU may trigger a "polling message" to indicate to the network that the WTRU has moved out of the mobile-originated-only mode and may now be paged for a pre-defined or configured period of time. When the WTRU leaves the mobile-originated-only mode and reads the SIB, the flag in the SIB may indicate the WTRU to either monitor the paging channel, or to send a "polling" message to notify that the WTRU became reachable, or to return to the mobile-originated-only mode. When the length of the period expires and the WTRU has not received any paging or no flag was set in the SIB, the WTRU may transition back to the mobile-originated-only mode.

An MTC subscriber may trigger a specific MTC device or an MTC group to transition from the mobile-originated-only mode to the mobile-originated-and-terminated mode, or vice versa. An MTC subscriber is a legal entity having a contractual relationship with the network operator to provide a service to one or more MTC devices. An MTC group is a group of MTC devices that belong to the same MTC subscriber. In accordance with one embodiment, an address field of a message may allow the MTC subscriber to send a unicast, multicast and broadcast trigger to a specific MTC device or an MTC group. The address field may be partitioned to reserve a range of addresses for unicast and multicast addresses, (e.g., the most significant bit (MSB) of the address field may be used to indicate a multicast or unicast address). A specific address may be reserved to indicate a broadcast address, (e.g., the "all ones" address).

Figure 5:
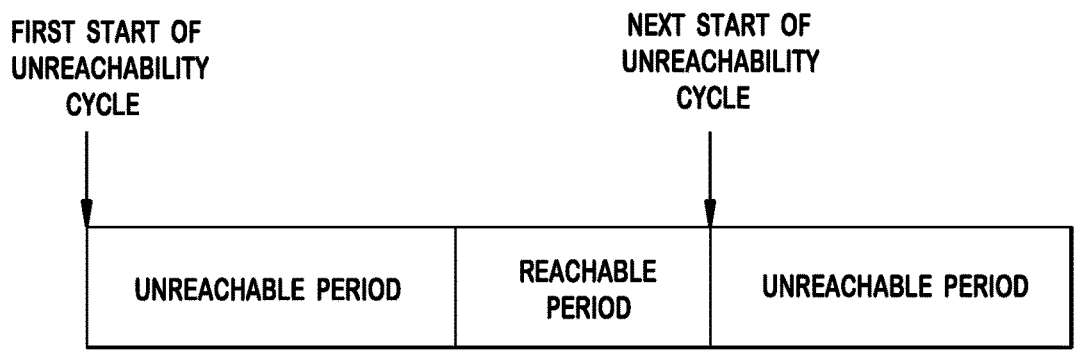
FIG. 5 is an example reachable period and unreachable period.

A WTRU may transition between the mobile-originated-and-terminated mode and the mobile-originated-only mode periodically. When the WTRU is in the mobile-originated-only mode, it may be referred to be in the unreachable period, and when the WTRU is out of the mobile-originated-only mode, it may be referred to be in a reachable period. FIG. 5 shows an example reachable period and unreachable period. The WTRU may alternate between the unreachable period and the reachable period based on a configured rule(s).

The WTRU may enter and exit the unreachable period based on any implicit or explicit triggers disclosed above. The WTRU may exit the unreachable period based on the reachability cycle or based on an event such as expiration of a timer or uplink activity. Once the WTRU exits the unreachable period, the WTRU may remain in the reachable period, (i.e., in "regular" idle mode), until a new unreachability cycle starts. Alternatively, the network may instruct the WTRU to return to the unreachable period. This instruction may be sent via a broadcast message, a paging message, or the like. Alternatively, the network may instruct the WTRU to establish an RRC connection and enter an RRC connected mode.

Explicit trigger may be a message from the network to the WTRU. This message may be an NAS message, an RRC dedicated message, a broadcast message, a paging message, or the like. In case the trigger is from the RNC/eNodeB, the trigger information may also be propagated to the core network, so that the SGSN/MME are aware of the WTRU reachability status.

Implicit triggers may be an event, such as the expiration of an activity timer or a pre-configured reachability cycle. In case of implicit trigger, the WTRU may notify the network that it is entering the unreachable period or the reachable period. The WTRU may notify the NAS or RRC entities, or both. In case, the WTRU notifies the RRC entity, the information may be propagated to the core network, so that the SGSN/MME are aware of the WTRU reachability status. The reachability cycle of the WTRU may be pre-configured in the network, in which case a notification from the WTRU may not be needed.

For the operations in the mobile-originated-only mode (including the infrequent-mobile-terminated mode), the WTRU may receive from the network, or be pre-configured with, a configuration including the unreachability cycle. The configuration may indicate timing for activating the first cycle of the unreachable period and/or the duration of the cycle. The WTRU may receive the configuration from the core network via a message, (e.g., Attach Accept, Location Update Accept, and Tracking Area Update Accept), or from the radio access network (RAN), (e.g., via an RRC message). If the configuration is received from the RAN, the RAN may propagate it to the core network nodes. If the WTRU has been pre-configured with the unreachability cycle, the WTRU may inform the parameters to be used to the network entity in the RAN, (e.g., RNC or eNodeB), and/or in the core network, (e.g., SGSN, MME). This notification may be part of the NAS message, (e.g., Attach, Location Update, and Tracking Area Update) or the RRC message, (e.g., RRC connection request). If the notification is sent as an RRC message, it may be propagated to the core network nodes. The reachable period may be configured in terms of an absolute time and period. More specifically, the network may specify an absolute time, (e.g., 2 pm), and a period, (e.g., X hours, minutes, or seconds). More than one absolute time may be specified within a day or certain time period. The WTRU configures its RRC and NAS entities in terms of the unreachability cycle to be used and the RRC entity may then configure the lower layers to perform the functions as disclosed above.

At the start of the unreachability cycle, the WTRU may go to sleep and wake up at the end of the unreachability cycle unless the application layer or other events trigger the WTRU to wake up in the middle of the unreachable period. The unreachable and reachable periods may define the periods in which the WTRU transitions between the mobile-originated-only mode and the mobile-originated-and-terminated mode.

The WTRU may wake up (or exit the mobile-originated-only mode) upon a request to place a call, (e.g., emergency call in a packet-switched (PS) or circuit-switched (CS) domain, or other distress signal that may be introduced for low priority devices). The WTRU may not enter the mobile-originated-only mode until the call, (e.g., the emergency call), is finished or until there are no more resources for the call (e.g., until a packet data network (PDN) or packet data protocol (PDP) context that was used for the emergency call is cleared or deactivated). The WTRU may not enter the mobile-originated-only mode if the WTRU is attached for emergency services.

At the end of the unreachable period, the WTRU wakes up and acquires network synchronization and basic cell information using the previously stored network information, such as carrier frequency, cell ID, PLMN ID, and so on. If the WTRU is still within a range of the previous serving cell, the WTRU may verify that SIB has not changed. If the SIB has not changed, the WTRU may use the previously stored SIB information. If the SIB has changed, the WTRU may re-acquire the SIB information. The WTRU may calculate the next start of the unreachability cycle and enter the idle mode operation for the duration of the reachable period. The WTRU may resume paging monitoring, cell reselection, and other idle mode procedures. If the location area has changed, the WTRU may trigger a location area update.

If the previous serving cell is no longer within a range, the WTRU may undertake a full cell search while keeping the PLMN. The WTRU may perform cell reselection and location area update.

At the end of the reachable period, the WTRU may end the idle mode procedures and enter the unreachable period and go to sleep.

If the WTRU transitions out of the mobile-originated-only mode to make a transmission, the WTRU may remain as reachable for a certain period of time. The time period may be determined with respect to the initiation of the first transmission, (e.g., RRC connection establishment), within the transmission of an NAS message, within a data transmission, or the like. The time period may be re-initiated after every transmissions or reception. Once the time period expires the WTRU may autonomously release an RRC connection (if applicable) and move to the mobile-originated-only mode. Alternatively, the WTRU may release the RRC connection, move to a mobile-originated-and-terminated mode (i.e., normal idle mode in this case), and monitor an additional inactivity timer, after expiration of which the WTRU transitions to the mobile-originated-only mode.

The network may broadcast an indication that WTRUs in the mobile-originated-only mode come out of the mobile-originated-only mode. A NodeB(s) may send a special information element to request WTRUs to come out of the mobile-originated-only mode, for example, in the system information, (e.g., SIB1). This may be broadcast by all NodeBs, or by a targeted NodeB(s). For example, the special information element may be sent by a NodeB(s) where the information about the number of mobile-originated-only mode WTRUs is needed. The special information element may include a flag to indicate whether the mobile-originated-only mode WTRUs are required to come out of the mobile-originated-only mode, a list of target WTRUs (this may be used if the network wants to reach a specific WTRU(s), for example, to track the location of the WTRU(s)), or a group identification for a group of WTRUs, (the group identification may be related to WTRU access class or some other WTRU specific feature). The special information element may also include information related to how and when the WTRUs come out of the mobile-originated-only mode. This may be necessary as the special information element may trigger more than one WTRU to come out of the mobile-originated-only mode, which allows the network to spread out (in time) the activation of these WTRUs and have some control over the resulting load that activated WTRUs would generate on the access network.

A WTRU in the mobile-originated-only mode may monitor, on a regular basis, the system information to acquire the special information element. At these instances, the WTRU may initially try to acquire the system information from the last known cell on which it camped. If it is not possible, (e.g., if the last camped cell is no longer in a range), the WTRU may perform a cell selection to acquire the system information. The WTRU may not camp on the new cell, but acquire the SIB containing the special information element.

Upon reading the special information element, the WTRU may evaluate if it needs to come out of the mobile-originated-only mode, for example, based on the type of information contained in the system information. If the network has targeted specific WTRUs, (e.g., the special information element contains a list of specific WTRU addresses or a group identification), the WTRU may come out of the mobile-originated-only mode if the WTRU is included in the target list. If not, the WTRU may remain in the mobile-originated-only mode. If the WTRU is in the target list, the WTRU may determine the timing to transition out of the mobile-originated-only mode. This may be immediate, or based on some parameters that are included in the special information element.

Once the WTRU receives an indication to trigger a mobile originated communication, (i.e., to come out of the mobile-originated-only mode), the WTRU may perform a cell selection and initiate an RRC connection request to the network. Upon receiving the RRC connection request message, the network may determine if it needs to move the WTRU out of the mobile-originated-only mode and send an RRC connection setup or an RRC connection reject message to make the WTRU come out of the mobile-originated-only mode. The WTRU may be required to send a polling message to the network.

It should be noted that the embodiments described above may be used independently or in any combination.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method of using a wireless transmit/receive unit (WTRU) supporting machine-type communications for use in a wireless network, comprising:

sending a non-access stratum (NAS) message to the wireless network that requests a first timer parameter that is for a first WTRU timer that indicates to the WTRU to change from a mobile origination and termination mode to a WTRU power savings mode in which the WTRU does not perform cell reselection;

receiving a first timer value for the first WTRU timer from the network;

setting the first WTRU timer based on the received first timer value; and entering the power savings mode based on the first WTRU timer expiring.

2. The method of claim 1, wherein the NAS message comprises one of a tracking area update message and, a routing area update message.

3. The method of claim 1, wherein the power saving mode further comprises the WTRU not performing at least one of page monitoring, location area updates, and system information monitoring in power savings mode.

4. The method of claim 1, further comprising the WTRU sending an NAS message to the wireless network that requests a second timer parameter for a second WTRU timer that indicates to the WTRU to change from the WTRU power savings mode to the mobile origination and termination mode.

5. The method of claim 4, wherein the WTRU sending the NAS message that requests the first timer parameter and sending the NAS message that requests the second timer parameter comprises the WTRU sending the requests for the first and the second timer parameters in the same NAS message.

6. The method of claim 4, further comprising the WTRU receiving a second timer value, from the wireless network, for the second WTRU timer.

7. The method of claim 6, wherein the WTRU receiving the first and the second timer values comprises the WTRU receiving the first and the second received timer values in the same message.

8. The method of claim 7, further comprising the WTRU setting the second WTRU timer based on the received second timer value.

9. The method of claim 8, further comprising the WTRU exiting the power savings mode based on the second timer expiring.

10. The method of claim 9, further comprising the WTRU sending a location area update message to the network after the WTRU exits the WTRU power savings mode.

11. A wireless transmit/receive unit (WTRU) supporting machine-type communications for use in a wireless network, comprising:

a processor configured to:

send a non-access stratum (NAS) message to the wireless network that requests a first timer parameter that is for a first WTRU timer that indicates to the WTRU to change from a mobile origination and termination mode to a WTRU power savings mode in which the WTRU does not perform cell reselection;

receive a first timer value for the first WTRU timer from the network;

set the first WTRU timer based on the received first timer value; and enter the WTRU into the power savings mode based on the first WTRU timer expiring.

12. The WTRU of claim 11, wherein the NAS message comprises one of a tracking area update message and, a routing area update message.

13. The WTRU of claim 11, wherein the power saving mode further comprises the WTRU not performing at least one of page monitoring, location area updates, and system information monitoring in power savings mode.

14. The WTRU of claim 11, wherein the processor is further configured to send an NAS message to the wireless network that requests a second timer parameter for a second WTRU timer that indicates to the WTRU to change from the WTRU power savings mode to the mobile origination and termination mode.

15. The WTRU of claim 14, wherein the processor is further configured to send the NAS message that requests the first timer parameter and send the NAS message that requests the second timer parameter in the same NAS message.

16. The WTRU of claim 14, wherein the processor is further configured to receive a second timer value, from the wireless network, for the second WTRU timer.

17. The WTRU of claim 16, wherein the processor is further configured to receive the first and the second timer values in the same message.

18. The WTRU of claim 17, wherein the processor is further configured to set the second WTRU timer based on the received second timer value.

19. The WTRU of claim 18, wherein the processor is further configured to exit the WTRU from the power savings mode based on the second timer expiring.

20. The WTRU of claim 19, wherein the processor is further configured to send a location area update message to the network after the WTRU exits the WTRU power savings mode.

* * * * *